US012645267B2

(12) United States Patent
Sprenger et al.

(10) Patent No.: US 12,645,267 B2
(45) Date of Patent: Jun. 2, 2026

(54) PRIVACY COVER SLIDER

(71) Applicant: Intel Corporation, Santa Clara, CA (US)

(72) Inventors: Mark E. Sprenger, Tigard, OR (US); Aleksander Magi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/954,908

(22) Filed: Sep. 28, 2022

(65) Prior Publication Data

US 2023/0014680 A1 Jan. 19, 2023

(51) Int. Cl.
*G06F 1/16* (2006.01)

(52) U.S. Cl.
CPC .......... *G06F 1/1686* (2013.01); *G06F 1/1656* (2013.01)

(58) Field of Classification Search
CPC ..... G06F 1/1686; G06F 1/1656; G03B 17/48; G03B 11/04; G03B 11/041; G03B 11/043
See application file for complete search history.

(56) References Cited

U.S. PATENT DOCUMENTS

| | | | | |
|---|---|---|---|---|
| 9,507,241 | B1 * | 11/2016 | Schantz | ................. H04N 23/57 |
| 10,070,021 | B1 * | 9/2018 | Rolle | .................... H04N 23/51 |
| 2022/0269149 | A1 * | 8/2022 | Stone | ................... G03B 17/565 |

FOREIGN PATENT DOCUMENTS

| | | | | |
|---|---|---|---|---|
| WO | WO-2019156683 A1 * | 8/2019 | ........... G03B 11/043 |
| WO | WO-2019172898 A1 * | 9/2019 | ............. H04N 23/55 |

* cited by examiner

*Primary Examiner* — Christopher E Mahoney
(74) *Attorney, Agent, or Firm* — Banner & Witcoff, Ltd.

(57) ABSTRACT

Particular embodiments described herein provide for a privacy cover in an electronic device. The electronic device includes a camera facing a first direction towards a user, an illumination source facing a second direction, opposite the first direction, and the privacy slider. The privacy slider includes a camera cover, an illumination source reflector, and an indicator that is illuminated by the illumination source when the camera is covered by the camera cover, where the indicator is located in a plane that is perpendicular to a plane that includes the camera.

19 Claims, 14 Drawing Sheets

PRIVACY COVER SLIDER

TECHNICAL FIELD

This disclosure relates in general to the field of computing, and more particularly, to a privacy cover slider.

BACKGROUND

End users have more electronic device choices than ever before. A number of prominent technological trends are currently afoot and these trends are changing the electronic device landscape. Some of the technological trends involve a device that includes a display and a camera.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 1A-1E are a simplified block diagram of a system to enable a privacy cover slider, in accordance with an embodiment of the present disclosure;

Figure 1A:
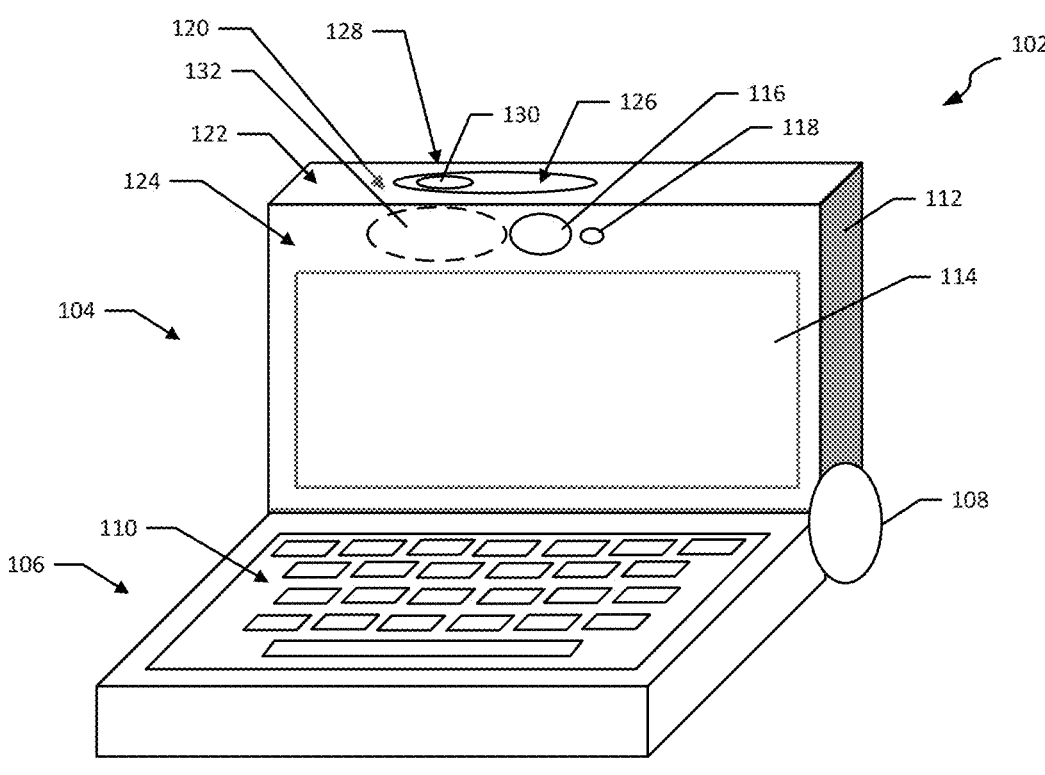

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a privacy cover slider in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

In an example, an electronic device can include a chassis, a camera, a display, and a privacy cover. The chassis defines the outer surface of the electronic device and the chassis can include a top chassis portion and a display portion. The top chassis portion is perpendicular to the display portion. The display and the camera are on the display portion and when the electronic device is in an open clamshell configuration the display, the camera, and the display portion are front facing and in a line of sight of a user.

The top chassis portion can include a slider channel. The privacy cover can include a slider and a camera cover. The slider is located in the slider channel on the top chassis portion of the electronic device. The slider includes a top indicator portion that is visible to a user when the user is looking at the top chassis portion. When the electronic device is in an open clamshell configuration, the top chassis portion is facing up or away from a surface that is supporting the electronic device.

The camera cover is located in the same plane as the camera on or parallel to the display portion and is perpendicular to the top chassis portion. To cover the camera with the privacy cover, the slider can be moved along the slider channel to move the camera cover over the camera. When the privacy cover is covering the camera, all or a portion of the top indicator portion of the slider can illuminate to provide a visual indicator to the user that the camera is covered by the camera cover. More specifically, the slider can include a top chassis indicator to provide the visual indicator to the user that the camera is covered by the camera cover. In some examples, the top chassis indicator can be an illuminated icon or symbol (e.g., a camera that is crossed out or a red circle with a 45-degree diagonal line inside the circle from upper-left to lower-right) that informs the user that the camera is covered by the camera cover. By locating the top chassis indicator on the top chassis portion of the electronic device, a greater field of view can be used to view the visual indicator as to compared to an indicator in the display or an indicator on the display portion of the chassis.

In addition, in some examples, when the privacy cover is covering the camera, a portion of the privacy cover can illuminate to provide a front facing visual indicator to the user that the camera is covered by the camera cover. More specifically, the privacy cover can include a user facing indicator to provide the front facing visual indicator to the user that the camera is covered by the camera cover.

In an illustrative example, the slider can collect light from a back firing light source (e.g., an LED) located on a camera housing for the camera and direct the light to the top indicator portion of the slider to provide a visual indication to a user that the camera is covered by the camera cover. The visual indication to the user is visible from relatively close (e.g., a few feet) and relatively far distances (e.g., tens of feet) in the environment around the electronic device so long as the top chassis portion of the electronic device is in the light of sight of the user. If the visual indicator was only on the display portion of the electronic device, then the visual indicator may only be visible when the user is looking at the display portion of the electronic device. By locating the visual indicator on the top chassis portion of the electronic device, a greater field of view can be used to view the visual indicator.

The term "front" and "front facing" are relative terms to indicate a direction away from the electronic device. For example, an image on a display of the electronic device is front facing to enable a user to view the image on the display. The term "back" and "back facing" are relative terms to indicate a direction into the electronic device. For example, the back facing illumination source is not visible by the user. A front facing device is facing the opposite direction as a back facing device.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus twenty percent (±20%) variation. For example, about one (1) millimeter (mm) would include one (1) mm and ±0.2 mm from one (1) mm. Similarly, terms indicating orientation of various elements, for example, "coplanar," "perpendicular," "orthogonal," "parallel," or any other angle between the elements generally refer to being within plus or minus five to twenty percent (+/−5-20%) of a target value based on the context of a particular value as described herein or as known in the art.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments.

Example Electronic Device

Figure 1B:
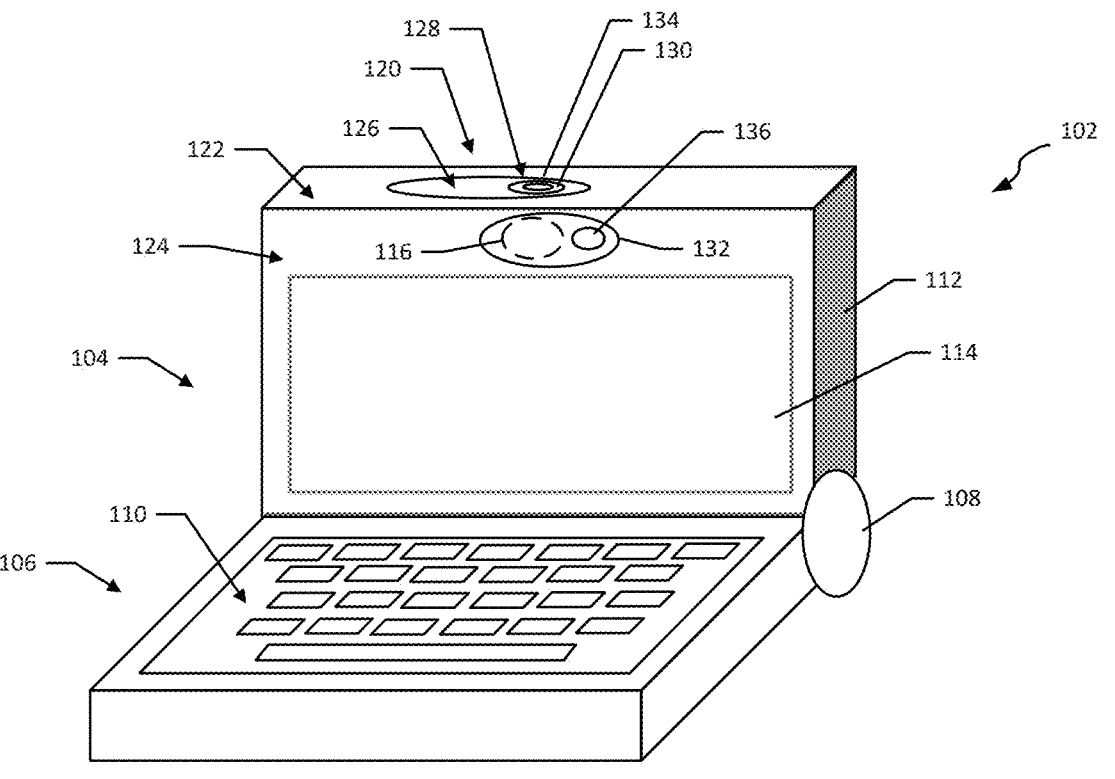

FIGS. 1A-F are simplified block diagrams of an electronic device 102, in accordance with an embodiment of the present disclosure. In an example, the electronic device 102 can include a first housing 104 and a second housing 106. The first housing 104 can be pivotably or rotatably coupled to the second housing 106 using a hinge 108. The second housing 106 can include a keyboard 110 and/or some other user input device or devices. In some examples, as illustrated in FIGS. 1A and 1B, the electronic device is a laptop computer.

The first housing 104 can include a chassis 112, a display 114, a camera 116, a camera light 118, and a privacy cover 120. The chassis 112 defines the outer surface of the first housing 104 and the chassis 112 can include a top chassis portion 122 and a display portion 124. The top chassis portion 122 is perpendicular to the display portion 124. The display 114 is on the display portion 124 and when the electronic device 102 is in an open clamshell configuration (as illustrated in FIGS. 1A and 1B), the display 114 and the display portion 124 are front facing and in a line of sight of a user. The camera 116 and the camera light 118 are also on the display portion 124. The camera light 118 is an indicator that can indicate when the camera is on or active. In some examples, the camera light 118 is an LED light that is red or some other color when the camera 116 is off or not active and green or some other color when the camera 116 is on or active.

The top chassis portion 122 can include a slider channel 126. The privacy cover 120 can include a slider 128 and a camera cover 132. The slider 128 is located in the slider channel 126 on the top chassis portion 122 of the electronic device 102. The slider 128 includes a top indicator portion 130 that is visible to a user when the user is looking at the top chassis portion 122. When the electronic device 102 is in an open clamshell configuration (as illustrated in FIGS. 1A and 1B), the top chassis portion 122 is facing up or away from a surface that is supporting the electronic device 102.

The camera cover 132 is located in the same plane as the camera 116 on or parallel to the display portion 124 and is perpendicular to the top chassis portion 122. In an example, as illustrated in FIG. 1A, when the camera cover 132 is not covering the camera 116, the camera cover 132 is not visible to the user. While FIGS. 1A-1E illustrate a specific arrangement or orientation of the camera 116 and the privacy cover 120, other arrangements and/or orientations may be used, depending on design choice and design limitations.

As illustrated in FIG. 1A, when the privacy cover 120 is not covering the camera 116, the camera 116 is unobstructed and the user can engage in a video session or other activities that use the camera 116. To cover the camera 116 with the privacy cover 120, the slider 128 can be moved along the slider channel 126 towards the camera 116 to move the camera cover 132 over the camera 116, as illustrated in FIG. 1B. When the privacy cover 120 is covering the camera 116, all or a portion of the top indicator portion 130 of the slider 128 can illuminate to provide a visual indicator 138 (illustrated in FIGS. 1D and 1E) to the user that indicates the camera 116 is covered by the camera cover 132. More specifically, the slider 128 can include a top chassis indicator 134 to provide the visual indicator 138 to the user that indicates the camera 116 is covered by the camera cover 132. In some examples, the top chassis indicator 134 can be an illuminated icon or symbol (e.g., a camera that is crossed out or a red circle with a 45-degree diagonal line inside the circle from upper-left to lower-right) that informs the user that the camera 116 is covered by the camera cover 132. In addition, in some examples, when the privacy cover 120 is covering the camera 116, a portion of the privacy cover 120 can illuminate to provide a front facing visual indicator 140 (illustrated in FIG. 1D) to the user that indicates the camera 116 is covered by the camera cover 132. More specifically, the privacy cover 120 can include a user facing indicator 136 to provide the front facing visual indicator 140 to the user that indicates the camera 116 is covered by the camera cover 132.

By locating the top chassis indicator 134 on the top chassis portion 122 of the electronic device 102, a greater field of view can be used to view the visual indicator as compared to an indicator in the display 114 or an indicator on the display portion 124 of the chassis. In addition, the privacy cover 120 can help with the legibility and aesthetic of the camera slider status as the visual indication to a user that the camera 116 is covered by the camera cover 132 can be viewed on two planes of interaction (the plane on the top chassis portion 122 of the electronic device 102 and the plane on the display portion 124 of the electronic device 102).

Figures 1C, 1D, 1E:
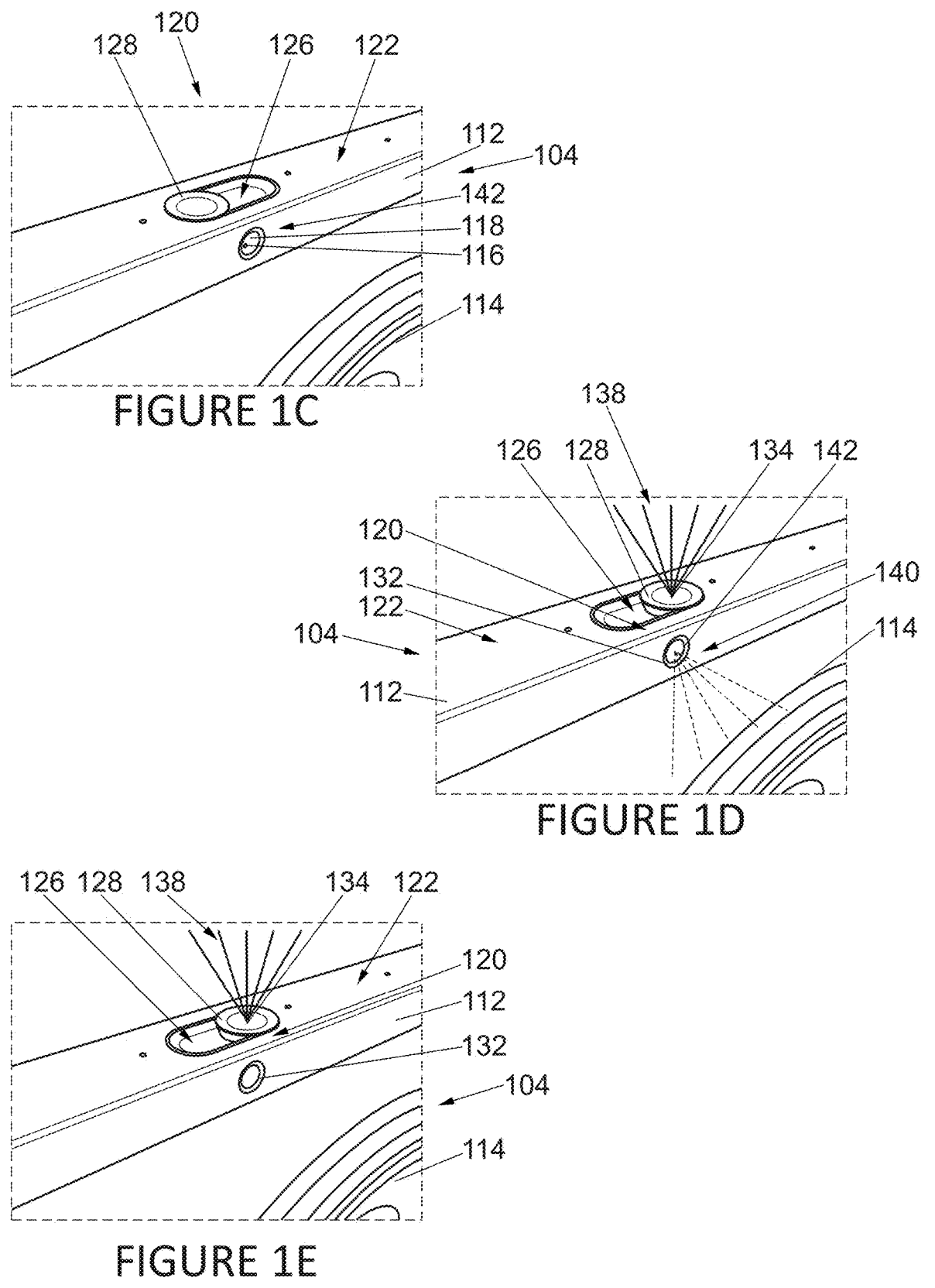

FIG. 1C illustrates a specific example of the first housing 104 when the privacy cover 120 is not covering the camera 116. The first housing 104 includes the chassis 112, the display 114, the privacy cover 120, and a camera opening 142. The camera opening 142 can include the camera 116 and the camera light 118. In some examples, the camera opening 142 includes a lens (not referenced) over the camera 116 and the camera light 118. The lens can be a protective lens to help protect the camera 116 from the environment (e.g., dust, water, foreign objects, etc.).

The chassis 112 includes the top chassis portion 122 and the display portion 124 (not referenced). The top chassis portion 122 includes the slider channel 126. The privacy cover 120 includes the slider 128 and the camera cover 132 (not shown). The slider 128 is located in the slider channel 126 in the top chassis portion 122 of the electronic device. When the camera 116 is not covered with the privacy cover 120, the camera 116 is unobstructed and the user can engage in a video session or other activities that use the camera 116. To cover the camera 116 with the privacy cover 120, the slider 128 can be moved along the slider channel 126 towards the camera 116 to move the camera cover 132 over the camera 116, as illustrated in FIG. 1D.

As illustrated in FIG. 1D, when the slider 128 is moved along the slider channel 126 towards the camera 116, the camera cover 132 is moved over the camera 116 to block the camera 116 and help prevent the camera from capturing an image or video. When the camera cover 132 is over the camera 116, the visual indicator 138 on the top chassis indicator 134 of the slider 128 can provide a visual indication to the user that the camera 116 is covered by the camera cover 132. In addition, when the privacy cover 120 is covering the camera 116, the front facing visual indicator 140 on the privacy cover 120 can provide a visual indication to the user that the camera 116 is covered by the camera cover 132.

In some examples, as illustrated in FIG. 1E, when the privacy cover 120 is covering the camera 116, the visual indicator 138 on the top chassis indicator 134 of the slider 128 can provide a visual indication to the user that the camera 116 is covered by the camera cover 132 and the privacy cover 120 does not illuminate.

The top chassis indicator 134 on the slider 128 allows a user to clearly see if the camera cover 132 has been engaged to cover the camera 116 from a range of distances. The top chassis indicator 134 does not occupy additional space on the chassis and minimizes the number of LED's required to replicate camera status on different planes. More specifically, once the user has positioned the privacy cover 120 to cover the camera 116 with the camera cover 132, an internal illumination source (e.g., a backfiring LED) can illuminate the top chassis indicator 134 to provide a visible indication to the user that the camera 116 is covered by the camera cover 132 from a "walk-up" experience.

It is to be understood that other embodiments may be utilized and structural changes may be made without departing from the scope of the present disclosure. Substantial flexibility is provided by the privacy cover, the electronic device, and/or the display in that any suitable arrangements and configuration may be provided without departing from the teachings of the present disclosure.

For purposes of illustrating certain example techniques of the privacy cover 120, the following foundational information may be viewed as a basis from which the present disclosure may be properly explained. A number of prominent technological trends are currently afoot (e.g., more computing devices, more online video services, more Internet traffic, etc.), and these trends are changing the media delivery landscape. One change is the use of a display. Generally, a display is an output device that displays information in pictorial form to a user.

Early electronic computers were fitted with a panel of light bulbs where the state of each particular bulb would indicate the on/off state of a particular register bit inside the computer. This allowed the engineers operating the computer to monitor the internal state of the machine and this panel of lights came to be known as the 'monitor.' As early monitors were only capable of displaying a very limited amount of information and were very transient, they were rarely considered for program output. Instead, a line printer was the primary output device and the monitor was limited to keeping track of the program's operation. Some of the first computer monitors used cathode ray tubes (CRTs). However, computer monitors that use CRTs are typically large heavy devices. LCDs and LEDs were created to reduce the size, weight, power consumption, etc. of the monitors and as the screen resolution improved, the monitors began to be called displays. As used herein, the terms "monitor" and "display" are synonymous.

One use of a display is for conference calls where users can remotely connect to each other over a network without having to physically be in the same room. Generally, the term "conference call" is used as an umbrella term for various types of online conferencing and collaborative services including webinars (web seminars), webcasts, and web meetings. Sometimes it may also be used in the more narrow sense of the peer-level web meeting context, in an attempt to disambiguate it from the other types known as collaborative sessions. In general, conference calls are made possible by Internet technologies, particularly on TCP/IP connections. Services may allow real-time point-to-point communications as well as multicast communications from one sender to many receivers. During a conference call, text-based messages, voice, and video can be shared simultaneously or near or almost simultaneously, across geographically dispersed locations. Applications for conference calls include meetings, training events, lectures, or presentations from a web-connected computer to other web-connected computers. Conference calls have become increasingly important in today's society. The conference call can offer an "in-person" meeting experience over a network and deliver real-time, face-to-face interactions between people using advanced visual, audio, and/or collaboration technologies. A conference call allows two or more locations to interact via simultaneous two-way audio and video transmissions. During the conference call, the display plays an integral part in the conference call, along with the camera that is used during the conference call.

Some emerging trends in displays include the integration of the camera into the display. The camera (or webcam) is a video camera that feeds or streams an image or video in real time to or through a computer to a network, such as the Internet. The camera is typically a relatively small device that is often built into or integrated into the display. The camera can be used during a conference call involving two or more people, with conversations that include live audio and video, during the conference calls, teleconferences, video calls, and other camera-related processes.

One drawback of a camera is the concern for privacy. Often a user may not know if the camera is on or off. Some users will cover the camera or webcam when the camera is not in use. Some current camera covers are not really camera covers and include a pop-up mechanism for the camera in the display. However, the pop-up mechanism can be visually distracting when up (enabled), is not as easy to use as a slider, and has more mechanical parts and complexity than a slider. Some camera covers are an add on accessory such as a camera flap. However, the add on camera flap can be difficult to operate quickly and may cause accidental movement of camera angle and/or dislodging of the camera product itself from the display when used. Some aftermarket camera covers include adhesive privacy covers that are attached to the display next to the camera. However, the adhesive privacy covers can be difficult to operate quickly and can create finger smudges around the slider portion of the adhesive privacy covers. Also, because the user is required to attached the adhesive privacy cover themselves, the adhesive privacy covers are not always centered properly around the camera. In addition, the sliding mechanism of some the adhesive privacy covers has a high risk of wear and tear. Some aftermarket camera covers are privacy stickers. However, privacy stickers are user intensive to attached and remove repeatedly, can become lost, and often the adhesive can wear off after repeated movements of attaching and removing. Some users use sticky tape or a sticky note. However, the sticky tape or sticky notes can be visually distracting, are user intensive to attached and remove repeatedly, can become lost, and often the adhesive can wear off after repeated movements of attaching and removing.

Currently, some electronic devices have integrated cameras and an integrated camera slider. However, the electronic devices that do have integrated cameras with integrated camera privacy sliders do not provide an intuitive privacy camera status indication to the user from both near and far away from the electronic device. Additionally, many of these designs add to the complexity of manufacturing and are aesthetically unappealing. The lack of intuitive control and feedback causes confusion for the user as the user may be unaware that the camera is indeed covered or exposed, both from a near distance and farther away from the environment of the electronic device. What is needed is an integrated privacy cover that can provide the user a visual indicator regarding the status of the camera from a near distance and farther away in the environment of the electronic device.

A system, method, apparatus, means, etc. to help enable a privacy cover slider that can provide the user with a visual indicator regarding the status of the camera from a near distance and farther away in the environment of an electronic device can resolve these issues (and others). In an example, a privacy cover (e.g., privacy cover 120) can include a slider (e.g., slider 128) and a camera cover (e.g., the camera cover 132). The slider can collect light from a back firing light source (e.g., an LED) located on a camera housing for a camera (e.g., camera 116) in an electronic device (e.g., electronic device 102) and direct the light to an indicator to provide a visual indication to a user that the camera is covered by the camera cover. The indicator can be located on a top chassis portion of the electronic device (e.g., top chassis portion 122) to provide a visual indication to the user that is visible from close and relatively far distances, as long as the visual indicator is in the line of sight of the user. If the visual indicator was only on the display portion of the electronic device, then the visual indicator may only be visible when the user is looking at the display portion of the electronic device. By locating the visual indicator on the top chassis portion of the electronic device, a greater field of view can be used to view the visual indicator. In addition, the privacy cover can help with the legibility and aesthetic of the camera slider status as the visual indication to a user that the camera is covered by the camera cover can be viewed on two planes of interaction (the plane on the top chassis portion of the electronic device and the plane on the display portion of the electronic device) and can simplify the manufacturability of the privacy cover. More specifically, the privacy cover can help simplify and can help optimize the manufacturability for the visual indicator by using an integrated slider with an intuitive visual indicator for both walk-up glance (top chassis portion) as well as in-front of the display (display portion). This can help improve the manufacturability of the privacy cover as well as help improve the overall user experience.

Figure 2:
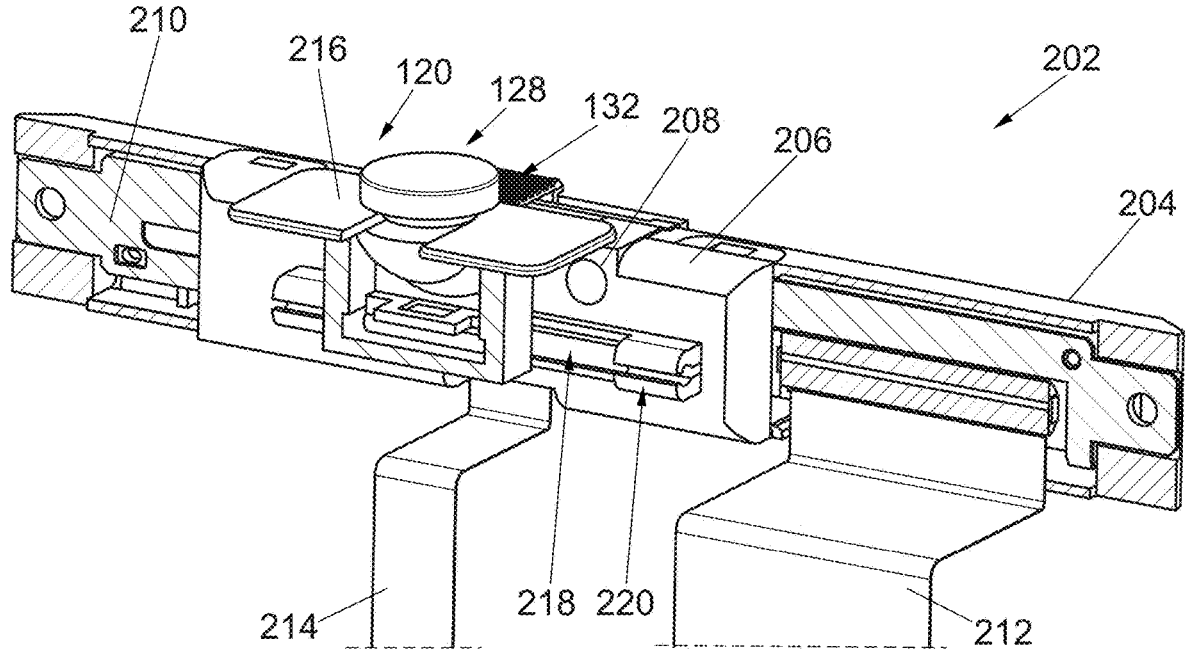
FIG. 2 is simplified block diagram illustrating example details of a portion of a system to enable a privacy cover slider, in accordance with an embodiment of the present disclosure.

Turning to FIG. 2, FIG. 2 illustrates example details of a camera assembly 202 and the privacy cover 120, in accordance with an embodiment of the present disclosure. As illustrated in FIG. 2, the camera assembly 202 can include a face plate 204, a camera housing 206, a back illumination light pipe 208, board backing 210, an electronic cable connection 212, and a camera support 214 (e.g., adhesive foam). The camera cover 132 can be between the face plate 204 and the camera housing 206. The camera cover 132 can include a slider support 216. The slider support 216 can support the slider 128. The camera housing 206 can include the slider track 218 and the back illumination light pipe 208. The slider 128 can be positioned to slide along slider track 218. The slider track 218 can include a slider bumper stop 220 to help prevent the slider 128 being moved or slid off of the slider track 218.

The camera assembly 202 houses and provides support the camera 116 (not shown) and allows the camera to be secured to the electronic device 102 (not shown). The face plate 204 is the front facing surface of the camera assembly 202 and can provide an aesthetically pleasing surface when viewed by a user. The camera housing 206 helps support and protect the camera. The back illumination light pipe 208 can help direct light from a back facing illumination source (e.g., back facing illumination source 308, illustrated in FIG. 3) to the slider 128. The board backing 210 can help provide support for the camera assembly 202 and can include attachment points to allow the camera assembly 202 to be secured to the electronic device. The electronic cable connection 212 can help facilitate the communication between processors (e.g., computer processing unit, graphics processing unit, etc.) in the electronic device and the camera and other components of the camera assembly 202 (e.g., microphone, light, IR sensor, etc.). The camera support 214 helps to provide support for the camera and keep the camera in a desired location.

Figure 3:
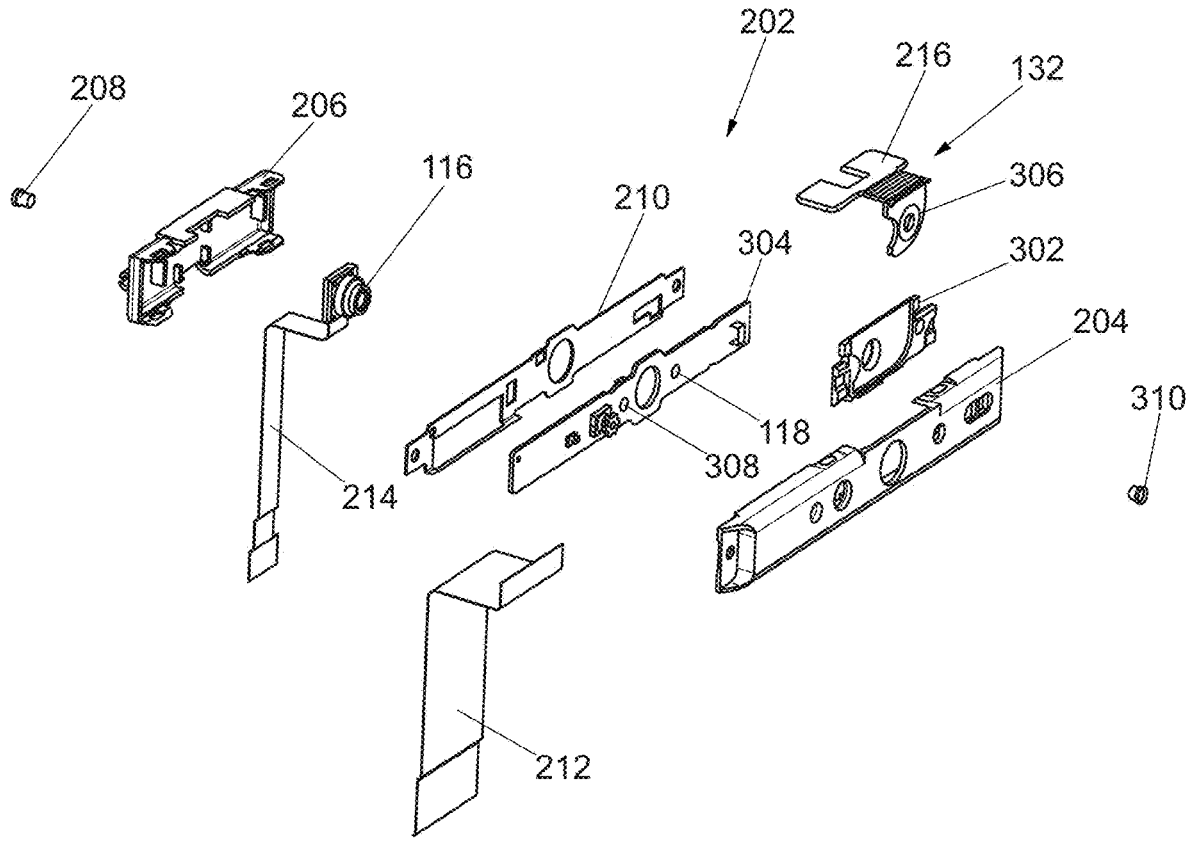
FIG. 3 is a simplified block diagram exploded view illustrating example details of a portion of a system to enable a privacy cover slider, in accordance with an embodiment of the present disclosure.

Turning to FIG. 3, FIG. 3 illustrates example details of the camera assembly 202, in accordance with an embodiment of the present disclosure. As illustrated in FIG. 3, the camera assembly 202 can include the camera 116, the camera light 118, the camera cover 132, the face plate 204, the camera housing 206, the back illumination light pipe 208, the board backing 210, the electronic cable connection 212, the camera support 214, a slider strike plate 302, a camera bezel board 304, a back facing illumination source 308, and a camera light pipe 310. The back illumination light pipe 208 can help guide light from the back facing illumination source 308 to the slider 128 (not shown). The slider strike plate 302 helps to support the camera cover 132 and helps to allow the camera cover 132 to slide so the camera cover 132 can be allowed to cover and uncover the camera 116. The camera bezel board 304 helps to align the lens of the camera 116. The camera cover 132 can include the slider support 216 and a camera lens cover 306.

Figures 4A, 4B:
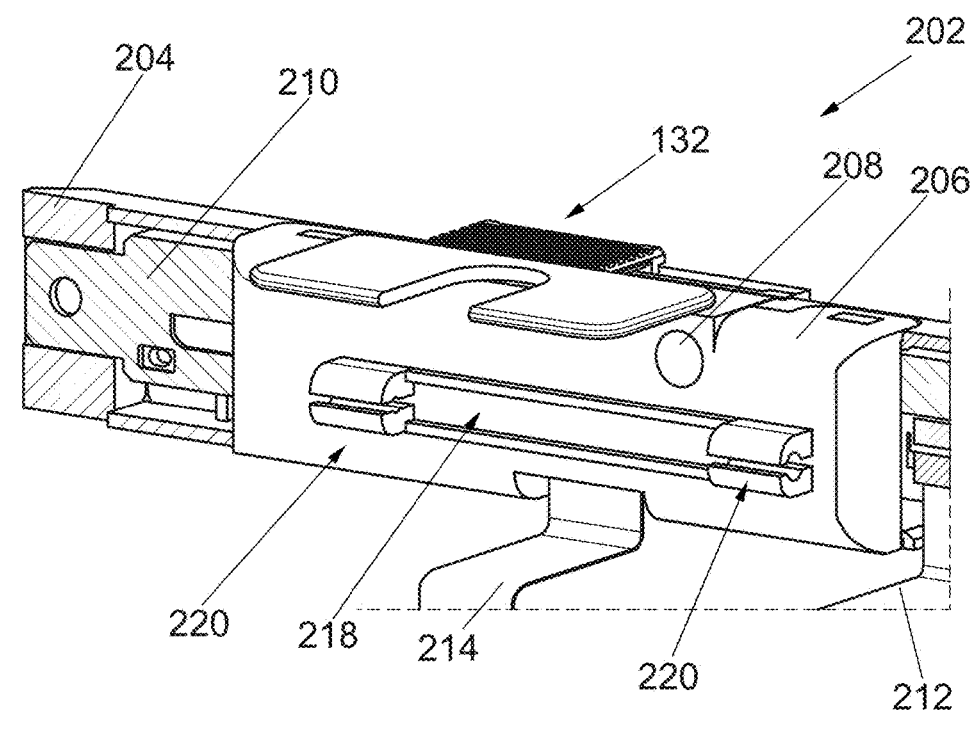
FIGS. 4A and 4B are simplified block diagrams illustrating example details of a portion of a system to enable a privacy cover slider, in accordance with an embodiment of the present disclosure.

Turning to FIG. 4A, FIG. 4A illustrates a back view of the camera assembly 202, in accordance with an embodiment of the present disclosure. As illustrated in FIG. 4A, the camera assembly 202 can include the face plate 204, the camera housing 206, the back illumination light pipe 208, the board backing 210, the electronic cable connection 212, and the camera support 214. The camera cover 132 can be between the face plate 204 and the camera housing 206. The camera cover 132 can include the slider support 216. The camera housing 206 can include the slider track 218. The slider track 218 can include the slider bumper stop 220. The slider support 216 can support the slider 128 (not shown) and the slider 128 can be positioned to slide along slider track 218 (as shown in FIG. 2).

Turning to FIG. 4B, FIG. 4B illustrates a front view of the camera assembly 202, in accordance with an embodiment of the present disclosure. As illustrated in FIG. 4B, the camera assembly 202 can include the camera 116, the camera light 118, the face plate 204, the camera housing 206, the electronic cable connection 212, and the camera support 214. The camera cover 132 can be between the face plate 204 and the camera housing 206.

Figure 5A:
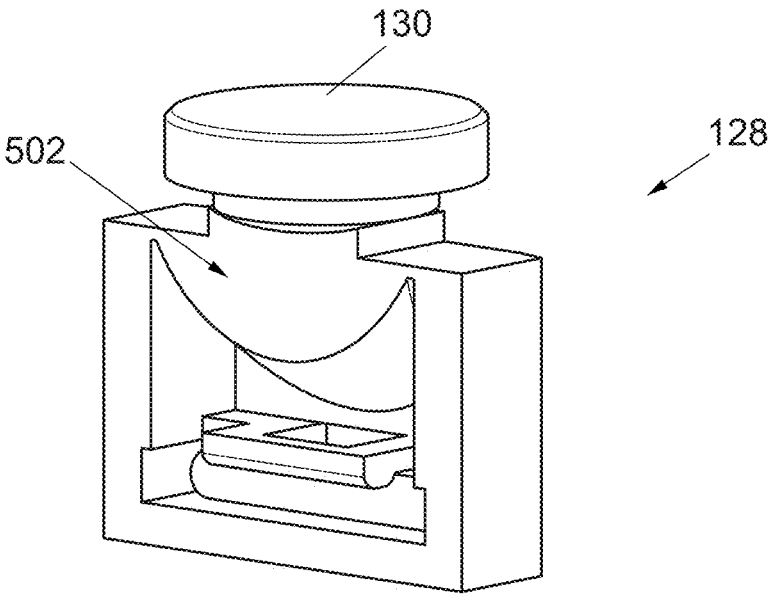
FIGS. 5A and 5B are simplified block diagrams illustrating example details of a portion of a system to enable a privacy cover slider, in accordance with an embodiment of the present disclosure.

Turning to FIG. 5A, FIG. 5A illustrates the slider 128, in accordance with an embodiment of the present disclosure. As illustrated in FIG. 5A, the slider 128 can include the top indicator portion 130 and a light reflector 502. The light reflector 502 can be a mirror or some other reflective surface that can reflect light. When the privacy cover 120 is covering the camera 116, light from the back facing illumination source 308 (not shown) can be reflected off of the light reflector 502 and illuminate all or a portion of the top indicator portion 130 of the slider 128 to provide a visual indication (e.g., the visual indicator 138) to the user that the camera 116 (not shown) is covered by the camera cover 132 (not shown).

Figure 5B:
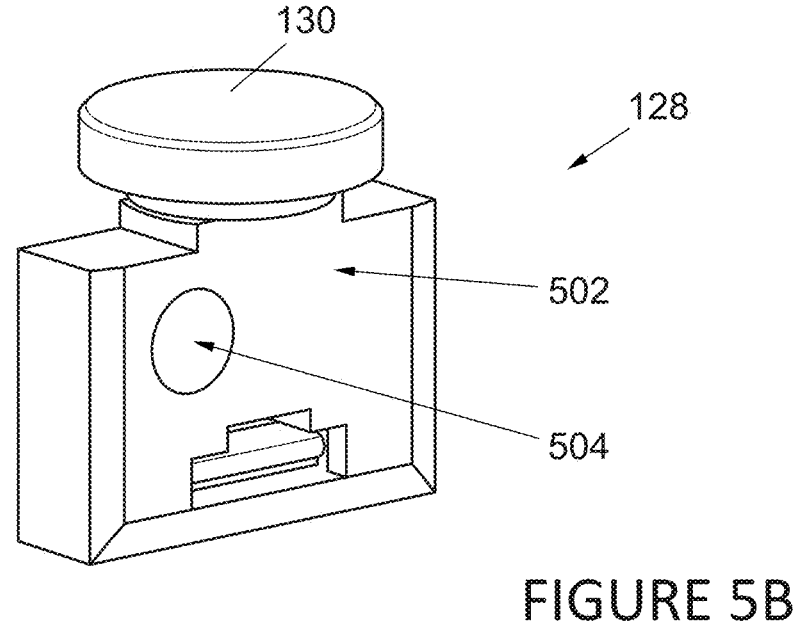

Turning to FIG. 5B, FIG. 5B illustrates the slider 128, in accordance with an embodiment of the present disclosure. As illustrated in FIG. 5B, the slider 128 can include the top indicator portion 130, the light reflector 502, and a light entry aperture 504. The light entry aperture 504 may be a hole or cavity in the slider 128 or may be a lens that helps to focus light onto the light reflector 502. When the privacy cover 120 is covering the camera 116, light from the back facing illumination source 308 can enter the slider 128 through light entry aperture 504, be reflected off of the light reflector 502, and illuminate all or a portion of the top indicator portion 130 of the slider 128 to provide a visual indication (e.g., the visual indicator 138) to the user that the camera 116 (not shown) is covered by the camera cover 132 (not shown).

Figure 6A:
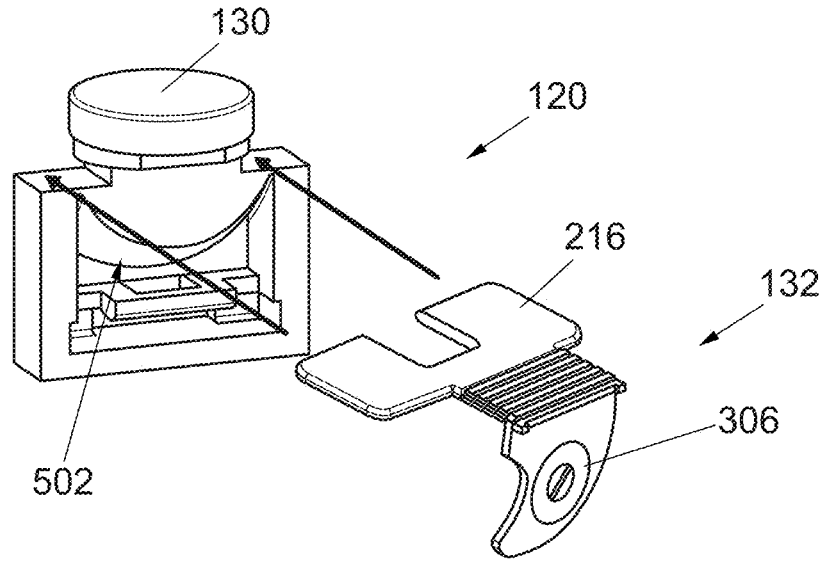
FIGS. 6A-6E are simplified block diagrams illustrating example details of a portion of a system to enable a privacy cover slider, in accordance with an embodiment of the present disclosure.

Turning to FIG. 6A, FIG. 6A illustrates the slider 128 being coupled with the camera cover 132 to create the privacy cover 120, in accordance with an embodiment of the present disclosure. The privacy cover 120 includes the top indicator portion 130 and the light reflector 502. The camera cover 132 includes the slider support 216 and the camera lens cover 306. The slider support 216 can have a profile that allows the camera cover 132 to slide under the top indicator portion 130. The top indicator portion 130 can have a mushroom profile that allows the top indicator portion 130 to be supported by the slider support 216.

Figure 6B:
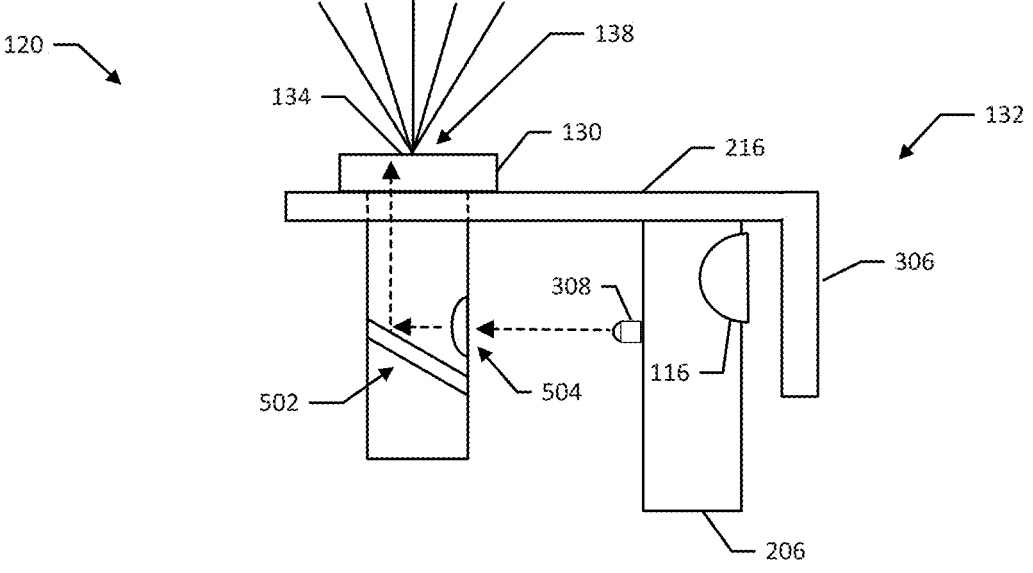

Turning to FIG. 6B, FIG. 6B illustrates the slider 128 coupled with the camera cover 132 to create the privacy cover 120, in accordance with an embodiment of the present disclosure. The privacy cover 120 includes the top indicator portion 130, the light reflector 502, and the light entry aperture 504. The camera cover 132 includes the slider support 216 and the camera lens cover 306. When the camera lens cover 306 covers the camera 116, light from the back facing illumination source 308 on the camera housing 206 can pass through the light entry aperture 504 to the light reflector 502. In some examples, the back illumination light pipe 208 (not shown) can help guide the light from the back facing illumination source 308, through the light entry aperture 504, and to the light reflector 502. The light reflector 502 reflects the light to the top indicator portion 130 to illuminate the top indicator portion 130 and provide the visual indication 138 to the user that the camera 116 is covered by the camera cover 132.

Figure 6C:
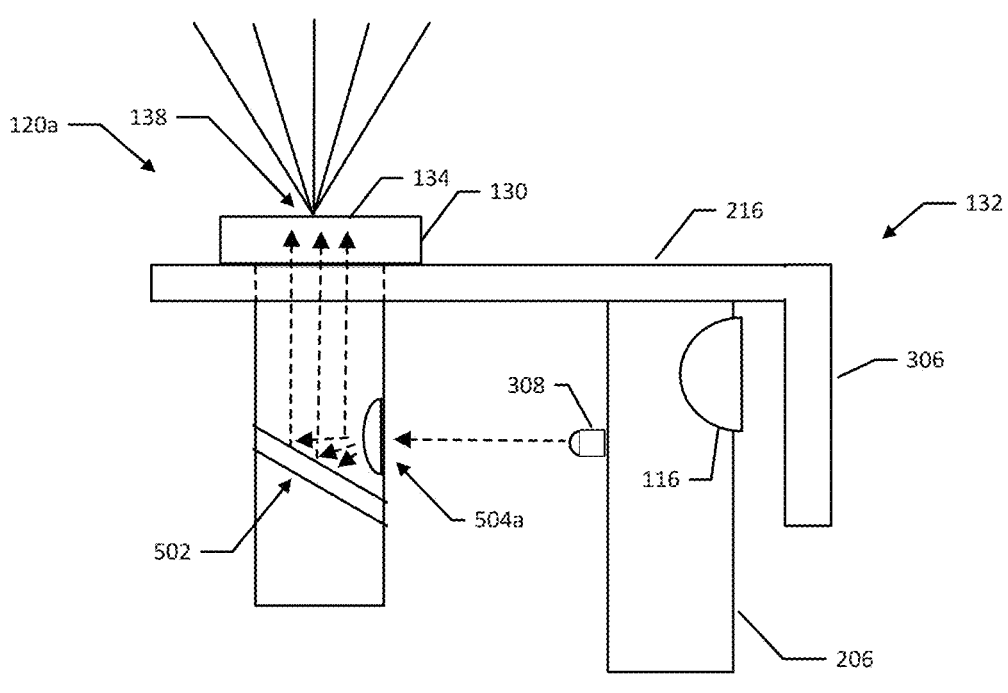

Turning to FIG. 6C, FIG. 6C illustrates the slider 128 coupled with the camera cover 132 to create a privacy cover 120a, in accordance with an embodiment of the present disclosure. The privacy cover 120a can include the top indicator portion 130, the light reflector 502, and a light entry aperture 504a. The camera cover 132 includes the slider support 216 and the camera lens cover 306. When the camera lens cover 306 covers the camera 116, light from the back facing illumination source 308 on the camera housing 206 can pass through the light entry aperture 504a to the light reflector 502. In some examples, the back illumination light pipe 208 (not shown) can help guide the light from the back facing illumination source 308 to the light entry aperture 504a to the light reflector 502. In some examples the light entry aperture 504a is a lens that disperses and/or focuses the light from the back illumination light pipe 208 onto the light reflector 502. The light reflector 502 reflects the light to the top indicator portion 130 to illuminate the top indicator portion 130 and provide the visual indication 138 to the user that the camera 116 is covered by the camera cover 132.

Figure 6D:
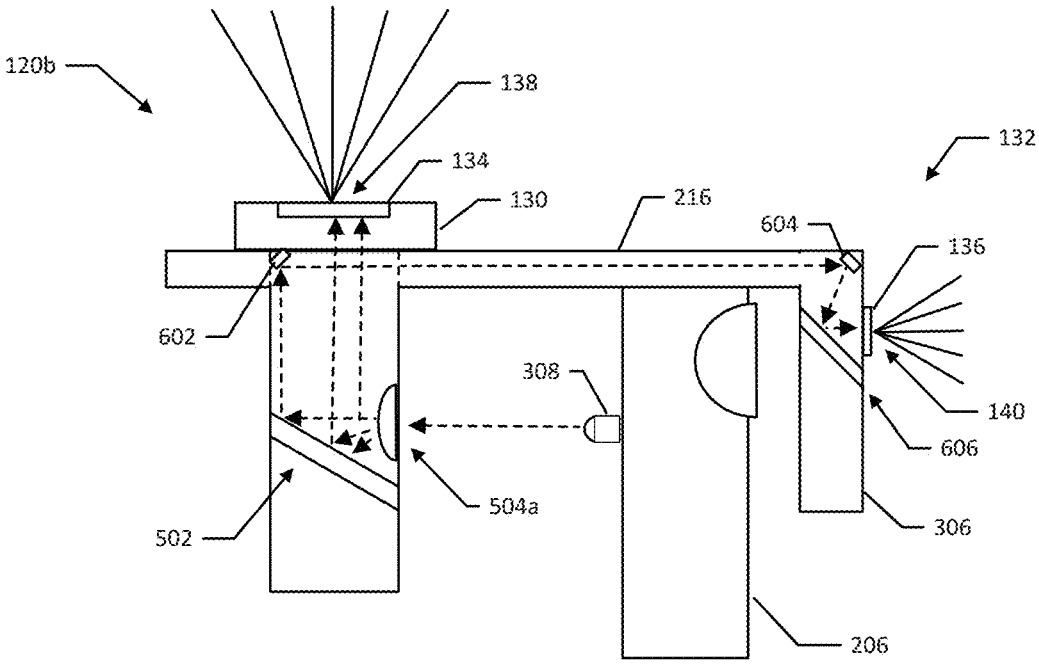

Turning to FIG. 6D, FIG. 6D illustrates the slider 128 coupled with the camera cover 132 to create a privacy cover 120b, in accordance with an embodiment of the present disclosure. The privacy cover 120b can include the top indicator portion 130, the light reflector 502, the light entry aperture 504a, and a first user facing indicator reflector 602. The camera cover 132 includes the slider support 216, the camera lens cover 306, a second user facing indicator reflector 604, and the user facing indicator 136. The camera lens cover 306 can include a third user facing indicator reflector 606.

When the camera lens cover 306 covers the camera 116, light from the back facing illumination source 308 on the camera housing 206 can pass through the light entry aperture 504*a* to the light reflector 502. In some examples, the back illumination light pipe 208 (not shown) can help guide the light from the back facing illumination source 308, through the light entry aperture 504*a*, and to the light reflector 502. The light reflector 502 reflects a portion of the light to the top indicator portion 130 to illuminate the top indicator portion 130 and provide the visual indication 138 to the user that the camera 116 is covered by the camera cover 132. In some examples, only a portion of the top indicator portion 130 is illuminated to provide the visual indication 138 to the user that the camera 116 is covered by the camera cover 132.

In addition, the light reflector 502 reflects a portion of the light to the first user facing indicator reflector 602. The first user facing indicator reflector 602 reflects the light to the second user facing indicator reflector 604. The second user facing indicator reflector 604 reflects the light to the third user facing indicator reflector 606. The third user facing indicator reflector 606 reflects the light to the user facing indicator 136 to illuminate the user facing indicator 136 and provide the front facing visual indicator 140 to the user that the camera 116 is covered by the camera cover 132.

Figure 6E:
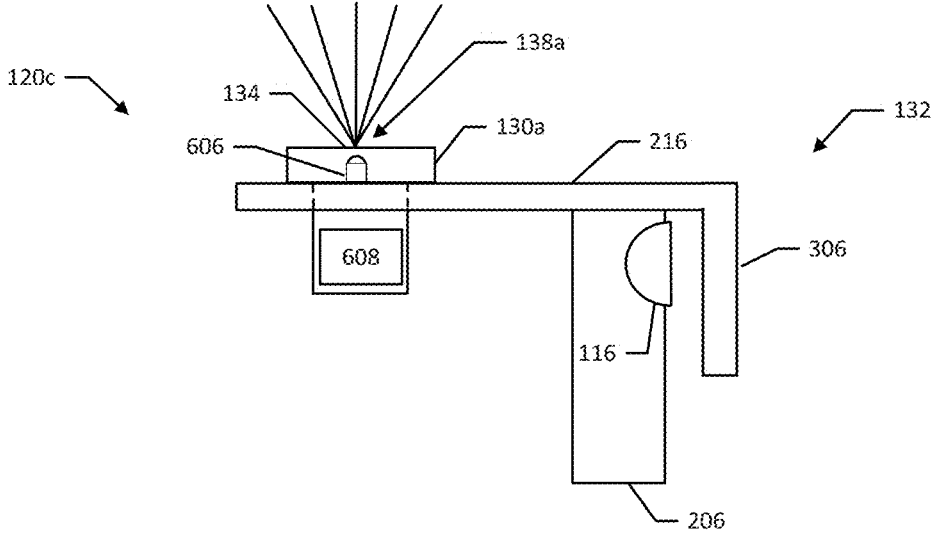

Turning to FIG. 6E, FIG. 6E illustrates a slider 128*a* coupled with a camera cover 132*a* to create the privacy cover 120*e*, in accordance with an embodiment of the present disclosure. The privacy cover 120*e* includes a top indicator portion 130*a* and an indicator control module 608. The top indicator portion 130*a* includes a slider illumination source 610. The camera cover 132 includes the slider support 216 and the camera lens cover 306.

The indicator control module 608 can control the slider illumination source 610 to provide the user with a visual indicator 138*a* regarding the status of the camera 116. For example, if the camera 116 is on and not covered, the light from the slider illumination source 610 can be red (or some other color) to create a red (or some other color) visual indicator 138*a*. If the camera is off and/or is covered by the camera lens cover 306, the light from the slider illumination source 610 can be green or yellow to provide the user with a green or yellow visual indicator 138*a* to indicate that the camera is off. Note that the color of the visual indicator 138*a* can depend on design choice. In some examples, the slider illumination source 610 is an LED light. Also, the slider illumination source 610 may only illuminate when the camera is covered by the camera lens cover 306.

In an illustrative example, the indicator control module 608 can determine when the camera lens cover 306 covers the camera 116. In some examples, the indicator control module 608 can use the amount of ambient light collected by the camera 116 to determine if the camera 116 is covered by the camera cover 132. More specifically, if the ambient light collected by the camera 166 is below a threshold (e.g., 10% or less light), then the indicator control module 608 can determine that the camera 116 is covered by the camera cover 132 (or some other object).

In another illustrative example, the indicator control module 608 receives a signal that indicates the camera 116 is covered by the camera cover 132. More specifically, in some examples, a switch (e.g., mechanical, magnetic, resistive, etc.) can be used to determine when the camera cover 132 has been positioned over the camera 116 and the switch can send a signal to the indicator control module 608 that the camera cover 132 is over the camera 116. In other examples, a light dependent resistor can be used as a darkness sensor to determine when the camera is covered by the camera cover 132 and the light dependent resistor can send a signal to the indicator control module 608 that the camera cover 132 is over the camera 116. The light dependent resistor can be exposed semiconductor material such as cadmium sulphide that changes its electrical resistance from several thousand ohms in the dark to only a few hundred ohms when light falls upon the light dependent resistor by creating hole-electron pairs in the exposed semiconductor material of the light dependent resistor. Note that the indicator control module 608 can use other means variations, alterations, and modifications as ascertained by one skilled in the art to determine when the camera 116 is covered by the camera cover 132.

Figure 7A:
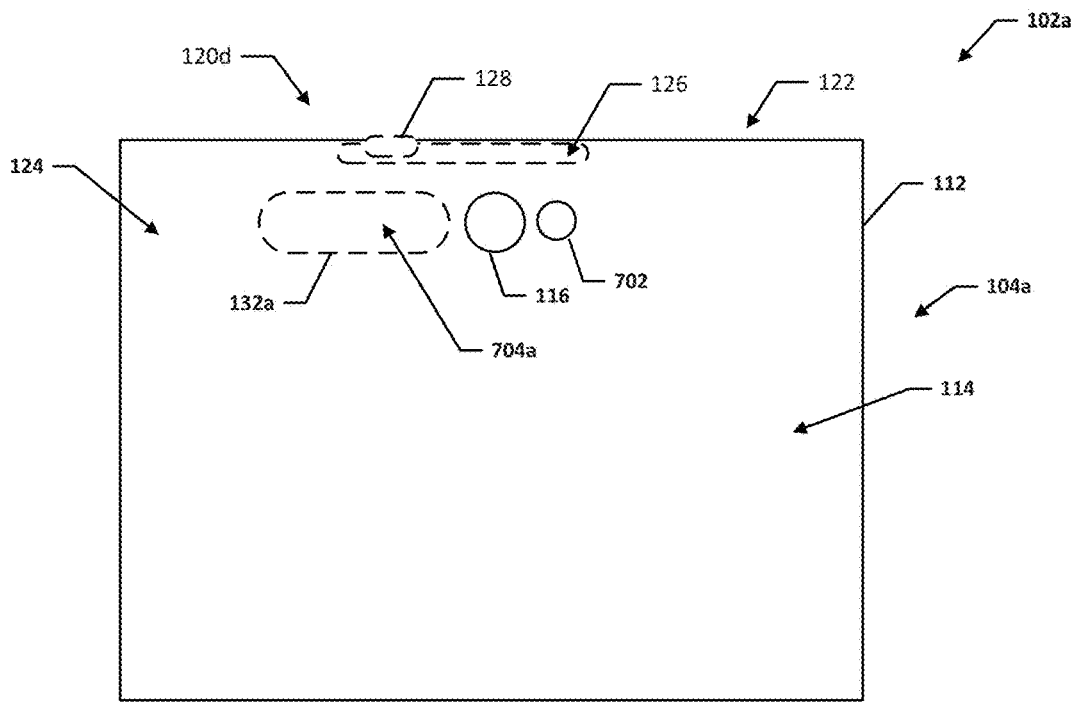
FIGS. 7A-7C are simplified block diagrams illustrating example details of a portion of a system to enable a privacy cover slider, in accordance with an embodiment of the present disclosure.
Figure 7B:
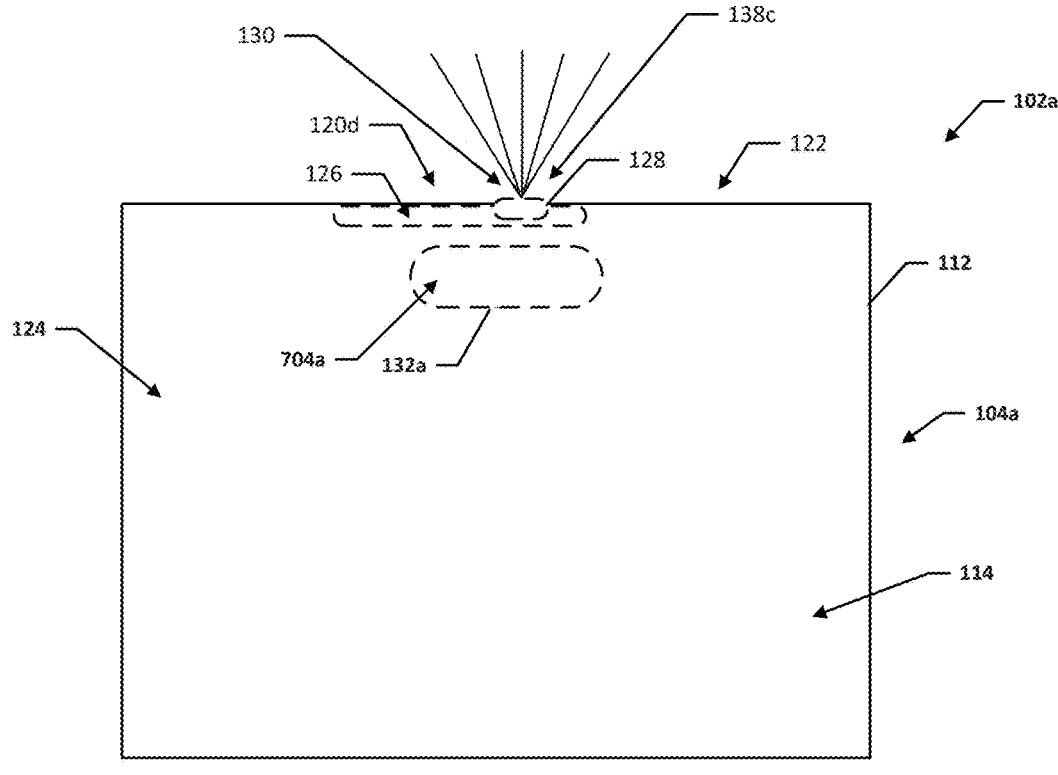
Figure 7C:
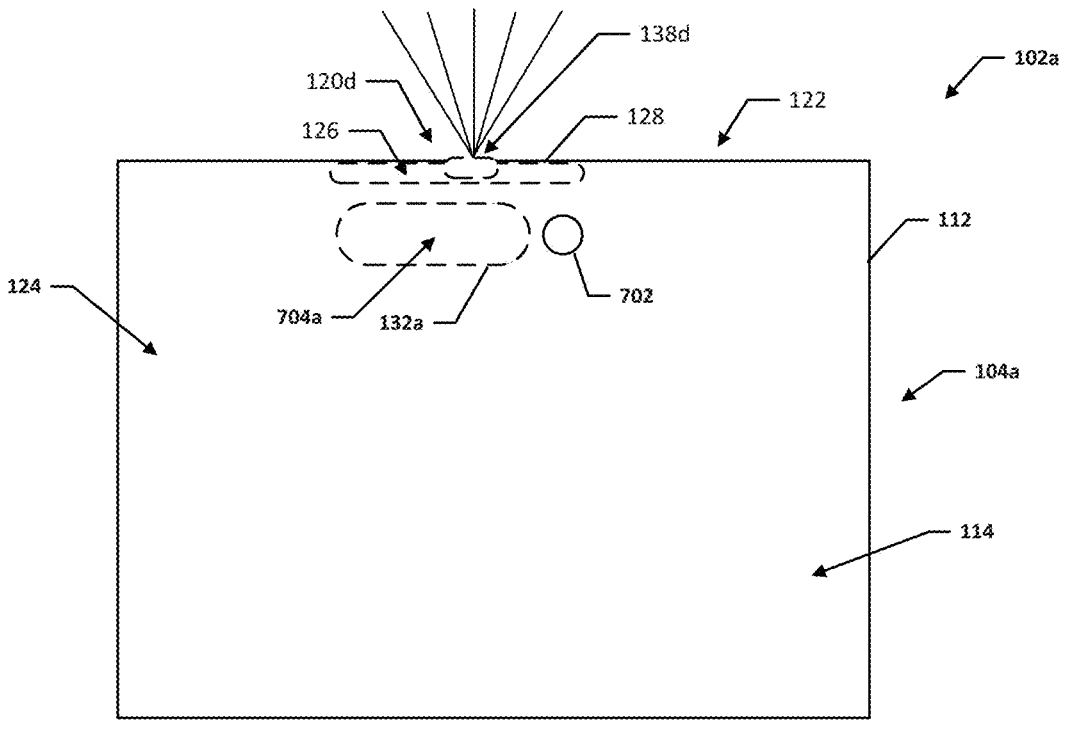

Turning to FIGS. 7A-7C, FIGS. 7A-7C are simple block diagrams illustrating example details of a portion of a privacy cover 120*d*, in accordance with an embodiment of the present disclosure. As illustrated in FIG. 7A, an electronic device 102*a* can include a first housing 104*a*. The first housing 104*a* can include the chassis 112, the display 114, the camera 116, a privacy cover 120*d*, and an infrared (IR) sensor 702. The chassis 112 can include the top chassis portion 122 and the display portion 124. The top chassis portion 122 can include the slider channel 126. The privacy cover 120*d* can include the slider 128 and a camera cover 132*a*. The camera cover 132*a* can have a body 704*a* configured to cover both the camera 116 and the IR sensor 702. The slider 128 is located in the slider channel 126 on the top chassis portion 122 of the electronic device 102*a*. The slider 128 includes the top indicator portion 130 (illustrated in FIG. 7B). The top indicator portion 130 can produce a visual indicator 138*c* (illustrated in FIG. 7B) that is visible to a user when the user is looking at the top chassis portion 122. The top chassis portion 122 is perpendicular to the display portion 124.

When the camera cover 132*a* is not covering the camera 116 and the IR sensor 702, the camera cover 132*a* is not visible to the user. To cover the camera 116 and the IR sensor 702 with the privacy cover 120*d*, the slider 128 can be moved along the slider channel 126 towards the camera 116 and the IR sensor 702 to move the camera cover 132*a* over the camera 116 and the IR sensor 702, as illustrated in FIG. 7B. When the privacy cover 120*d* is covering the camera 116 and the IR sensor 702, all or a portion of the top indicator portion 130 of the slider 128 can illuminate to provide the visual indicator 138*c* to the user that the camera 116 and the IR sensor 702 are covered by the camera cover 132*a*. For example, the visual indicator 138*c* can be an illuminated icon or symbol (e.g., a camera and IR symbol that are crossed out or a red circle with a 45-degree diagonal line inside the circle from upper-left to lower-right) that informs the user that the camera 116 and the IR sensor 702 are covered by the camera cover 132*a*.

In some examples, the slider 128 can be moved along the slider channel 126 towards the camera 116 and the IR sensor 702 to move the camera cover 132*a* over the camera 116 but not the IR sensor 702, as illustrated in FIG. 7C. When the privacy cover 120*d* is covering the camera 116 but not the IR sensor, all or a portion of the top indicator portion 130 of the slider 128 can illuminate a different color or different indicator to provide a visual indicator 138*d* to the user that the camera 116 is covered by the camera cover 132*a* and the IR sensor 702 is not covered by the camera cover 132*a*. For example, the visual indicator 138*d* can be an illuminated icon or symbol (e.g., a camera that is crossed out or a red circle with a 45-degree diagonal line inside the circle from upper-left to lower-right and an IR symbol that is not crossed out or is illuminated green) that informs the user that the camera 116 is covered by the camera cover 132a and the IR sensor 702 is not covered by the camera cover 132a. Note that other types of visual indicators can be used to provide the visual indicator 138c to the user that the camera 116 and the IR sensor 702 are covered by the camera cover 132a and to provide the visual indicator 138d to the user that the camera 116 is covered by the camera cover 132a and the IR sensor 702 is not covered by the camera cover 132a, depending on design choice and design constraints.

Figure 8A:
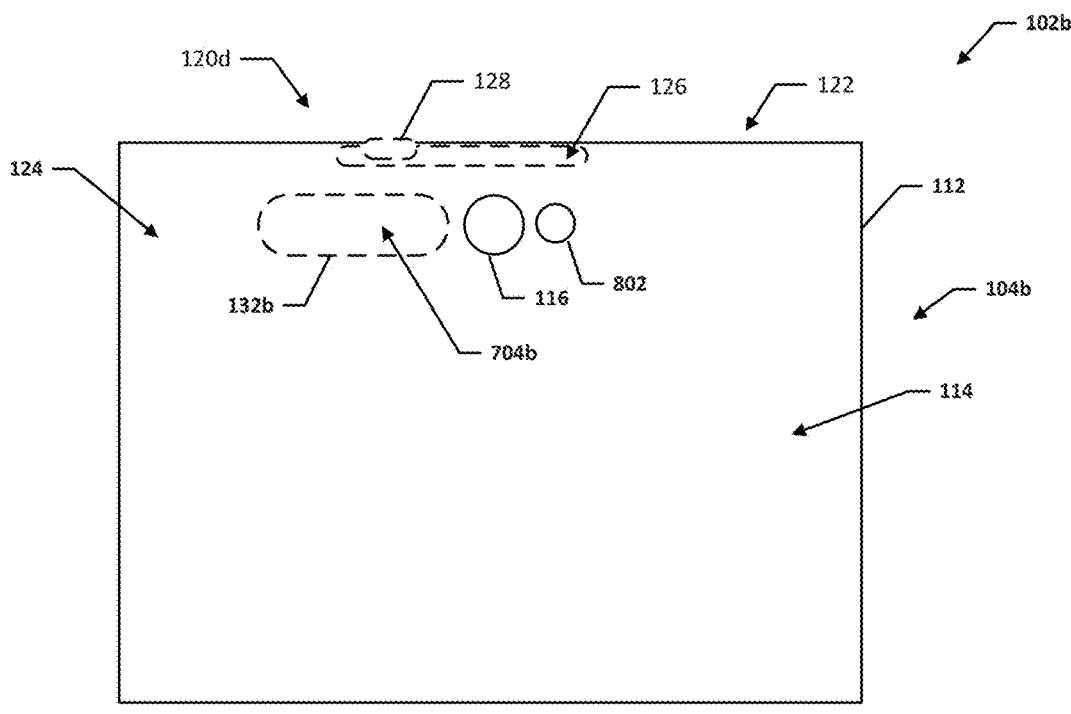
FIGS. 8A-8C are simplified block diagrams illustrating example details of a portion of a system to enable a privacy cover slider, in accordance with an embodiment of the present disclosure.
Figure 8B:
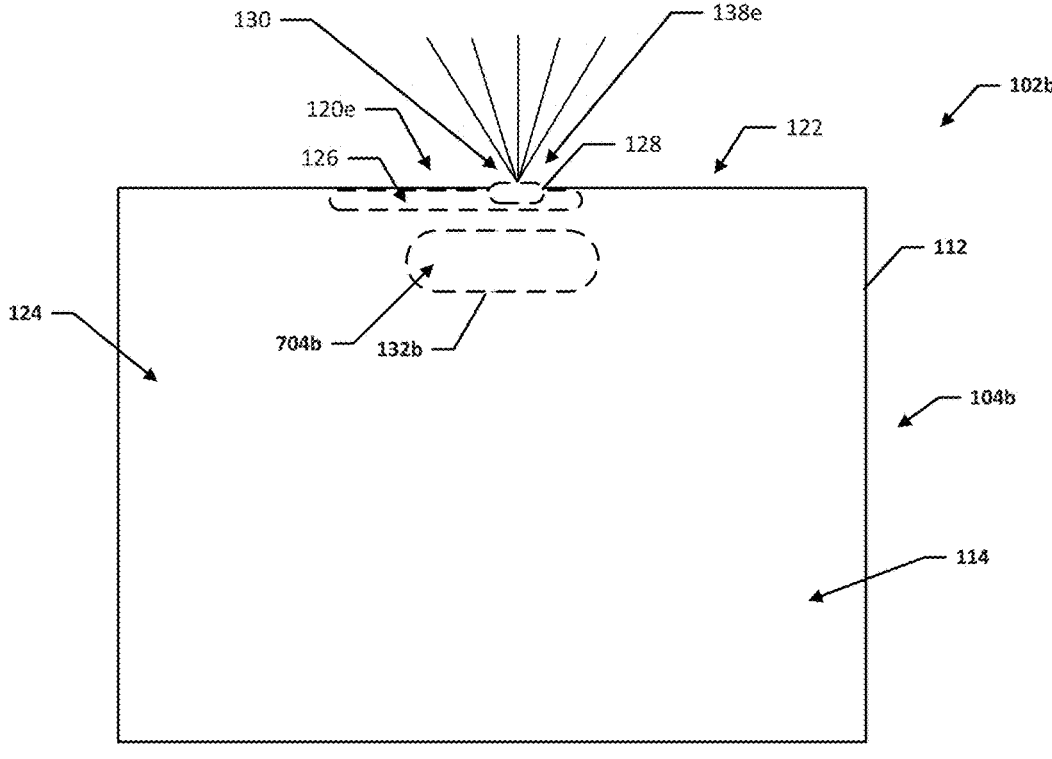
Figure 8C:
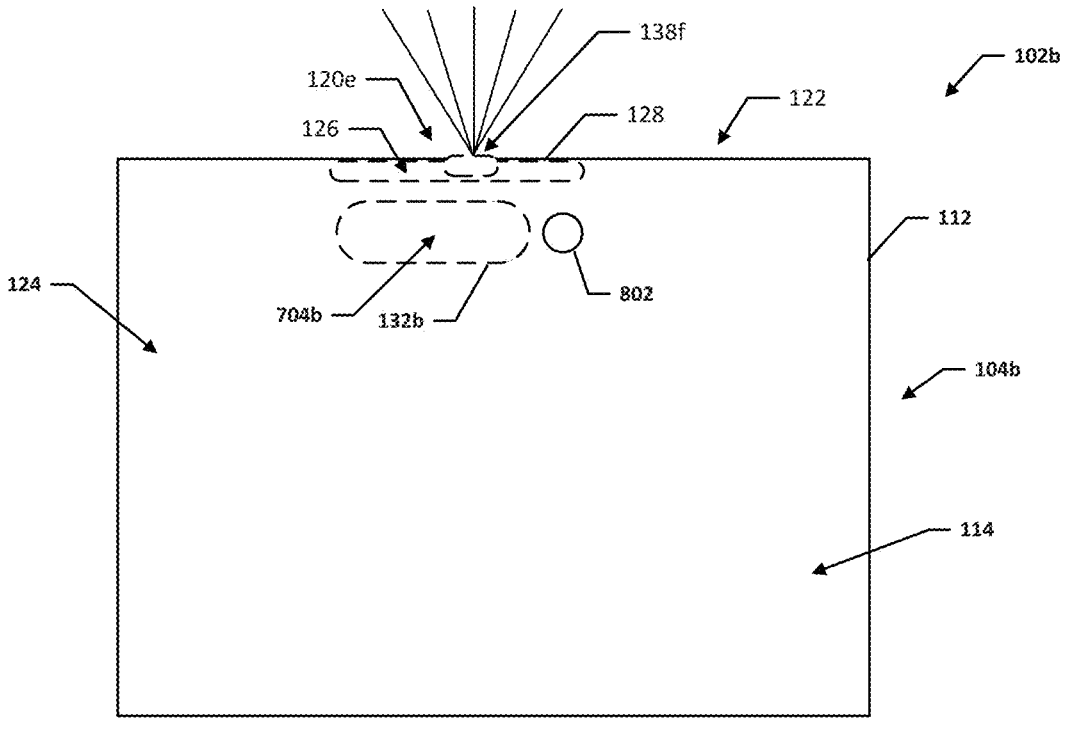

Turning to FIGS. 8A-8C, FIGS. 8A-8C are simple block diagrams illustrating example details of a portion of a privacy cover 120e, in accordance with an embodiment of the present disclosure. As illustrated in FIG. 8A, an electronic device 102b can include a first housing 104b. The first housing 104b can include the chassis 112, the display 114, the camera 116, a privacy cover 120e, and a microphone 802. The chassis 112 can include the top chassis portion 122 and the display portion 124. The top chassis portion 122 can include the slider channel 126. The privacy cover 120e can include the slider 128 and a camera cover 132b. The camera cover 132b can have a body 704b configured to cover both the camera 116 and the microphone 802. In some examples, the body 704b of the privacy cover 120e can include foam or some other sound dampening material to dampen the sound going to the microphone 802. The slider 128 is located in the slider channel 126 on the top chassis portion 122 of the electronic device 102b. The slider 128 includes the top indicator portion 130 (illustrated in FIG. 8B). The top indicator portion 130 can produce a visual indicator 138e (illustrated in FIG. 8B) that is visible to a user when the user is looking at the top chassis portion 122. The top chassis portion 122 is perpendicular to the display portion 124.

When the camera cover 132b is not covering the camera 116 and the microphone 802, the camera cover 132b is not visible to the user. To cover the camera 116 and the microphone 802 with the privacy cover 120e, the slider 128 can be moved along the slider channel 126 towards the camera 116 and the microphone 802 to move the camera cover 132b over the camera 116 and the microphone 802, as illustrated in FIG. 8B. When the privacy cover 120e is covering the camera 116 and the microphone 802, all or a portion of the top indicator portion 130 of the slider 128 can illuminate to provide the visual indicator 138e to the user that the camera 116 and the microphone 802 are covered by the camera cover 132b. For example, the visual indicator 138e can be an illuminated icon or symbol (e.g., a camera and microphone symbol that are crossed out or a red circle with a 45-degree diagonal line inside the circle from upper-left to lower-right) that informs the user that the camera 116 and the microphone 802 are covered by the camera cover 132b.

In some examples, the slider 128 can be moved along the slider channel 126 towards the camera 116 and the microphone 802 to move the camera cover 132b over the camera 116 but not the microphone 802, as illustrated in FIG. 8C. When the privacy cover 120e is covering the camera 116 but not the microphone 802, all or a portion of the top indicator portion 130 of the slider 128 can illuminate a different color or a different indicator to provide a visual indicator 138f to the user that the camera 116 is covered by the camera cover 132b and the microphone 802 is not covered by the camera cover 132b. For example, the visual indicator 138f can be an illuminated icon or symbol (e.g., a camera that is crossed out or a red circle with a 45-degree diagonal line inside the circle from upper-left to lower-right and a microphone symbol that is not crossed out or is illuminated green) that informs the user that the camera 116 is covered by the camera cover 132b and the microphone 802 is not covered by the camera cover 132b. Note that other types of visual indicators can be used to provide the visual indicator 138e to the user that the camera 116 and the microphone 802 are covered by the camera cover 132b and to provide the visual indicator 138f to the user that the camera 116 is covered by the camera cover 132b and the microphone 802 is not covered by the camera cover 132b, depending on design choice and design constraints. In addition, the camera cover 132 can be configured to cover or block other types of sensors and a visual indicator can be configured to provide a visual indication when the other types of sensors are covered by the camera cover 132, depending on design choice and design constraints.

Figure 9:
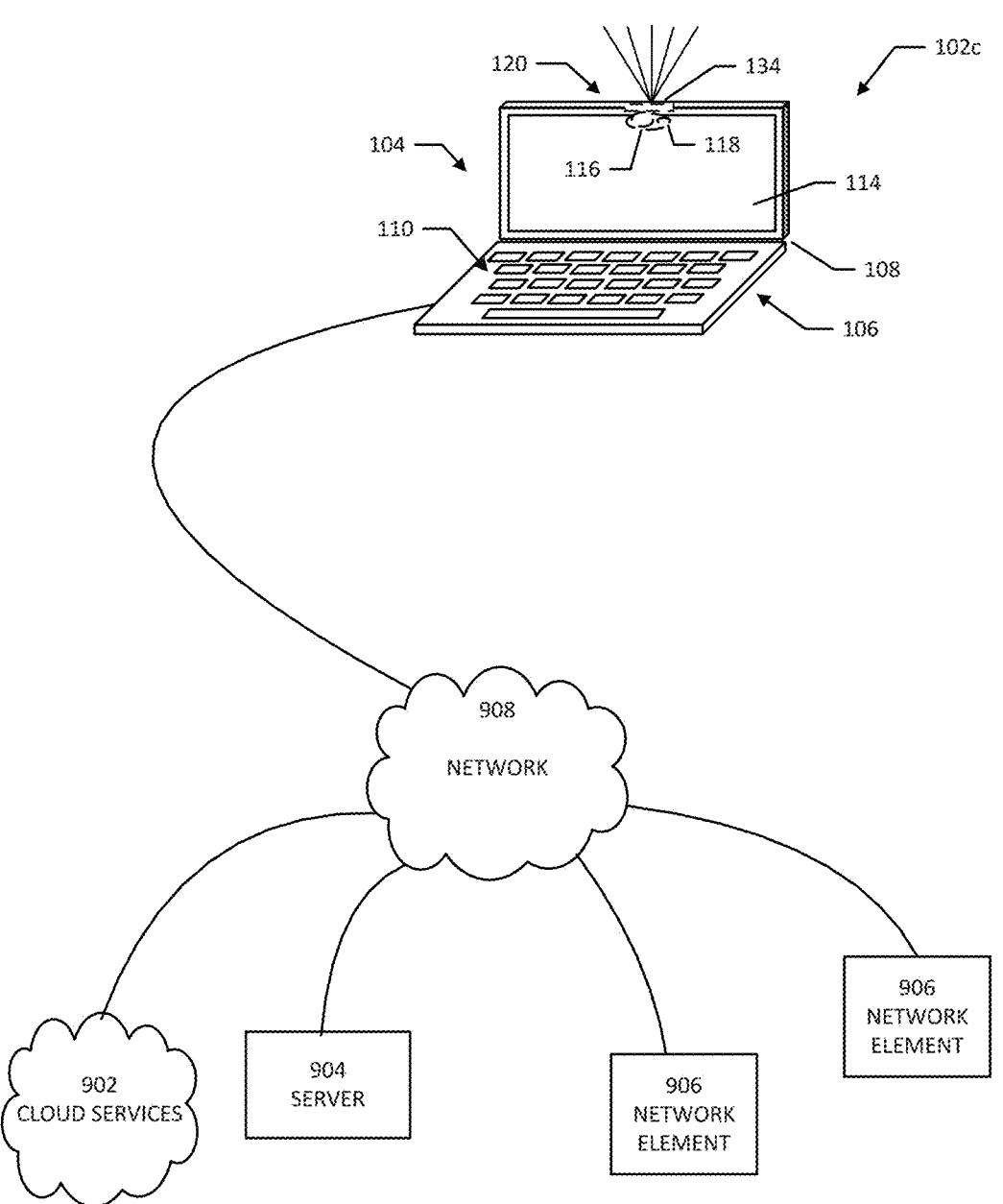
FIG. 9 is a simplified diagram simplified block diagram of a system that includes a modular vapor chamber a, in accordance with an embodiment of the present disclosure.

Turning to FIG. 9, FIG. 9 is a simplified block diagram of the electronic device 102 configured to include the privacy cover 120, in accordance with an embodiment of the present disclosure. In an example, the electronic device 102 can include the first housing 104 and the second housing 106. The first housing 104 can be rotatably or pivotably connected to the second housing 106 using the hinge 108. The first housing 104 can include the display 114, the camera 116, the camera light 118, and the privacy cover 120. The second housing can include the keyboard 110. As illustrated by the top chassis indicator 134, the privacy cover 120 is over the camera 116. By locating the top chassis indicator 134 on the top portion of the electronic device 102 (when the electronic device 102 is in an open clamshell configuration), a greater field of view can be used to view an indicator that indicates the privacy cover 120 is over the camera 116 as to compared to an indicator on or in the display 114 that may only be visible when the user is viewing the display.

The electronic device 102 (and electronic devices 102a and 102b) may be in communication with cloud services 902, a server 904 and/or one or more network elements 906 using a network 908. In other examples, the electronic device 102 (and electronic devices 102a and 102b) may be a standalone device and not in communication with the network 908. The network 908 represents a series of points or nodes of interconnected communication paths for receiving and transmitting packets of information. The network 908 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 908, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address.

These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, the electronic devices 102, 102a, and 102b are meant to encompass a computer, a personal digital assistant (PDA), a laptop or electronic notebook, hand held device, a cellular telephone, a smartphone, an IP phone, wearables, network elements, network appliances, servers, routers, switches, gateways, bridges, load balancers, processors, modules, or any other device, component, element, or object that includes a heat source and can allow for a modular vapor chamber and the connection of segments of the modular vapor chamber. Each of electronic devices 102, 102a, and 102b may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of the electronic devices 102, 102a, and 102b may include virtual elements.

In regards to the internal structure, each of the electronic devices 102, 102a, and 102b can include memory elements for storing information to be used in operations. Each of the electronic devices 102, 102a, and 102b may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

In an example implementation, elements of the electronic devices 102, 102a, and 102b may include software modules to achieve, or to foster, operations. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of the electronic devices 102, 102a, and 102b can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

It is also important to note that the preceding diagrams illustrate only some of the possible scenarios and patterns that may be executed by, or within, the electronic devices 102, 102a, and 102b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. Substantial flexibility is provided by the electronic devices 102, 102a, and 102b in that any suitable arrangements, chronologies, configurations, and timing mechanisms may be provided without departing from the teachings of the present disclosure.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the electronic devices 102, 102*a*, and 102*b* and their teachings are readily scalable and can accommodate a large number of components, as well as more complicated/sophisticated arrangements and configurations. Accordingly, the examples provided should not limit the scope or inhibit the broad teachings of the electronic devices 102, 102*a*, and 102*b* and as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the electronic devices 102, 102*a*, and 102*b* have been illustrated with reference to particular elements and operations, these elements and operations may be replaced by any suitable architecture, protocols, and/or processes that achieve the intended functionality of the electronic devices 102, 102*a*, and 102*b*.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a camera facing a first direction towards a user, an illumination source facing a second direction, opposite the first direction, and a privacy slider. The privacy slider including a camera cover, an illumination source reflector, and an indicator that is illuminated by the illumination source when the camera is covered by the camera cover, where the indicator is located in a plane that is perpendicular to a plane that includes the camera.

In Example A2, the subject matter of Example A1 can optionally include a chassis, where the chassis includes a top chassis portion perpendicular to a display portion that includes the camera, wherein the top chassis portion includes the indicator.

In Example A3, the subject matter of Example A2 can optionally include where the top chassis portion includes a slider channel that houses the indicator.

In Example A4, the subject matter of Example A3 can optionally include where the privacy slider slides along the slider channel to cause the camera cover to cover and uncover the camera.

In Example A5, the subject matter of Example A1 can optionally include where the camera cover includes a second indicator that is illuminated when the camera is covered by the camera cover.

In Example A6, the subject matter of Example A1 can optionally include where when the camera cover is not covering the camera, the camera cover is not visible to a user and the indicator is not illuminated by the illumination source.

In Example A7, the subject matter of Example A1 can optionally include where the indicator is an icon that is illuminated by the illumination source when the camera is covered by the camera cover.

In Example A8, the subject matter of Example A1 can optionally include where the electronic device is a laptop computer.

In Example A9, the subject matter of any one of Examples A1-A2 can optionally include where the top chassis portion includes a slider channel that houses the indicator.

In Example A10, the subject matter of any one of Examples A1-A3 can optionally include where the privacy slider slides along the slider channel to cause the camera cover to cover and uncover the camera.

In Example A11, the subject matter of any one of Examples A1-A4 can optionally include where the camera cover includes a second indicator that is illuminated when the camera is covered by the camera cover.

In Example A12, the subject matter of any one of Examples A1-A5 can optionally include where when the camera cover is not covering the camera, the camera cover is not visible to a user and the indicator is not illuminated by the illumination source.

In Example A13, the subject matter of any one of Examples A1-A6 can optionally include where the indicator is an icon that is illuminated by the illumination source when the camera is covered by the camera cover.

In Example A14, the subject matter of any one of Examples A1-A7 can optionally include where the electronic device is a laptop computer.

Example M1 is a method including illuminating an indicator on a privacy slider when the privacy slider is covering a camera in an electronic device, where the indicator is located in a plane that is perpendicular to a plane that includes the camera and illuminating a second indicator on the privacy slider, where the second indicator is located on a portion of the privacy slider that is covering the camera.

In Example M2, the subject matter of Example M1 can optionally include where the camera faces a first direction towards a user and the indicator is illuminated by an illumination source near the camera, wherein the illumination source faces a second direction that is opposite the first direction.

In Example M3, the subject matter of Example M2 can optionally include where the privacy slider includes an illumination source reflector that reflects light from the illumination source to the indicator.

In Example M4, the subject matter of Example M2 can optionally include where when the camera cover is not covering the camera, the indicator is not illuminated by the illumination source.

In Example M5, the subject matter of Example M1 can optionally include where the electronic device includes a chassis and the chassis includes a top chassis portion that includes the indicator and a display portion that includes the camera, wherein the top chassis portion of the chassis is perpendicular to the display portion of the chassis.

In Example, M6, the subject matter of Example M1 can optionally include where the top chassis portion includes a slider channel that houses the indicator.

In Example, M7, the subject matter of any one of the Examples M1-M2 can optionally include where the privacy slider includes an illumination source reflector that reflects light from the illumination source to the indicator.

In Example M8, the subject matter of any one of the Examples M1-M3 can optionally include where when the camera cover is not covering the camera, the indicator is not illuminated by the illumination source.

In Example M9, the subject matter of any one of the Examples M1-M4 can optionally include where the electronic device includes a chassis and the chassis includes a top chassis portion that includes the indicator and a display portion that includes the camera, wherein the top chassis portion of the chassis is perpendicular to the display portion of the chassis.

In Example, M10, the subject matter of any one of the Examples M1-M5 can optionally include where the top chassis portion includes a slider channel that houses the indicator.

Example AA1 is a privacy cover including a sensor cover to cover a sensor on a first portion of an electronic device, and a slider. The slider includes a visual indicator located in a second portion of the electronic device, where the first portion of the electronic device is perpendicular to the second portion of the electronic device and the visual indicator provides a visual indication that the sensor cover is over the sensor.

In Example AA2, the subject matter of Example AA1 can optionally include where the visual indicator is illuminated by an illumination source located on a sensor assembly that houses the sensor.

In Example AA3, the subject matter of Example AA2 can optionally include an illumination source reflector that reflects light from the illumination source to the visual indicator.

In Example AA4, the subject matter of Example AA3 can optionally include where the slider includes a lens to focus the light from the illumination source onto the illumination source reflector.

In Example AA5, the subject matter of Example AA1 can optionally include where the visual indicator is located on a top chassis portion of the electronic device, where the top chassis portion is perpendicular to a display portion of the electronic device that includes the sensor.

In Example AA6, the subject matter of Example AA5 can optionally include where the visual indicator is housed in a slider channel on the top chassis portion of the electronic device.

In Example AA7, the subject matter of any one of Examples AA1-AA2 can optionally include an illumination source reflector that reflects light from the illumination source to the visual indicator.

In Example AA8, the subject matter of any one of Examples AA1-AA3 can optionally include where the slider includes a lens to focus the light from the illumination source onto the illumination source reflector.

In Example AA9, the subject matter of any one of Examples AA1-AA4 can optionally include where the visual indicator is located on a top chassis portion of the electronic device, where the top chassis portion is perpendicular to a display portion of the electronic device that includes the sensor.

In Example AA10, the subject matter of any one of Examples AA1-AA5 can optionally include where the visual indicator is housed in a slider channel on the top chassis portion of the electronic device.

What is claimed is:

1. An electronic device comprising:
a camera facing a first direction towards a user;
an illumination source facing a second direction, opposite the first direction; and
a privacy slider, the privacy slider including:
a camera cover;
an illumination source reflector; and
an indicator that is illuminated by the illumination source when the camera is covered by the camera cover, wherein the indicator is located in a plane that is perpendicular to a plane that includes the camera.

2. The electronic device of claim 1, further comprising:
a chassis, wherein the chassis includes a top chassis portion perpendicular to a display portion that includes the camera, wherein the top chassis portion includes the indicator.

3. The electronic device of claim 2, wherein the top chassis portion includes a slider channel that houses the indicator.

4. The electronic device of claim 3, wherein the privacy slider slides along the slider channel to cause the camera cover to cover and uncover the camera.

5. The electronic device of claim 1, wherein the camera cover includes a second indicator that is illuminated when the camera is covered by the camera cover.

6. The electronic device of claim 1, wherein when the camera cover is not covering the camera, the camera cover is not visible to a user and the indicator is not illuminated by the illumination source.

7. The electronic device of claim 1, wherein the indicator is an icon that is illuminated by the illumination source when the camera is covered by the camera cover.

8. The electronic device of claim 1, wherein the electronic device is a laptop computer.

9. A method comprising:
illuminating an indicator on a privacy slider when the privacy slider is covering a camera in an electronic device, wherein the indicator is located in a plane that is perpendicular to a plane that includes the camera; and
illuminating a second indicator on the privacy slider, wherein the second indicator is located on a portion of the privacy slider that is covering the camera.

10. The method of claim 9, wherein the camera faces a first direction towards a user and the indicator is illuminated by an illumination source near the camera, wherein the illumination source faces a second direction that is opposite the first direction.

11. The method of claim 10, wherein the privacy slider includes an illumination source reflector that reflects light from the illumination source to the indicator.

12. The method of claim 10, wherein when the camera cover is not covering the camera, the indicator is not illuminated by the illumination source.

13. The method of claim 9, wherein the electronic device includes a chassis and the chassis includes a top chassis portion that includes the indicator and a display portion that includes the camera, wherein the top chassis portion of the chassis is perpendicular to the display portion of the chassis.

14. The method of claim 13, wherein the top chassis portion includes a slider channel that houses the indicator.

15. A privacy cover comprising:

a sensor cover to cover a sensor on a first portion of an electronic device; and a slider, including a visual indicator located in a second portion of the electronic device, wherein the first portion of the electronic device is perpendicular to the second portion of the electronic device, and wherein the visual indicator provides a visual indication that the sensor cover is positioned over the sensor and is illuminated by an illumination source located on a sensor assembly that houses the sensor.

16. The privacy cover of claim 15, further comprising:

an illumination source reflector that reflects light from the illumination source to the visual indicator.

17. The privacy cover of claim 16, wherein the slider includes a lens to focus the light from the illumination source onto the illumination source reflector.

18. The privacy cover of claim 15, wherein the visual indicator is located on a top chassis portion of the electronic device, wherein the top chassis portion is perpendicular to a display portion of the electronic device that includes the sensor.

19. The privacy cover of claim 18, wherein the visual indicator is housed in a slider channel on the top chassis portion of the electronic device.

\* \* \* \* \*